United States Patent [19]

Wirth

[11] Patent Number: 4,538,152
[45] Date of Patent: Aug. 27, 1985

[54] SURVEILLANCE RADAR SYSTEM WHICH IS PROTECTED FROM ANTI-RADAR MISSILES

[75] Inventor: Wulf D. Wirth, Rheinbach, Fed. Rep. of Germany

[73] Assignee: Siemens Aktiengesellschaft, Berlin & Munich, Fed. Rep. of Germany

[21] Appl. No.: 113,175

[22] Filed: Jan. 18, 1980

[30] Foreign Application Priority Data

Jan. 19, 1979 [DE] Fed. Rep. of Germany ....... 2902039

[51] Int. Cl.$^3$ .......................... G01S 13/00; G01S 7/36
[52] U.S. Cl. .............................. 343/5 VQ; 343/16 R; 343/18 E; 343/383; 343/444; 343/445
[58] Field of Search ........... 343/16 R, 16 M, 100 CL, 343/10, 18 E, 5 VQ, 383, 444, 445

[56] References Cited

U.S. PATENT DOCUMENTS

| | | | |
|---|---|---|---|
| 3,353,177 | 11/1967 | Wilmot | 343/5 VQ |
| 3,683,380 | 8/1972 | Cantwell, Jr. et al. | 343/5 VQ |
| 3,938,154 | 2/1976 | Lewis | 343/100 CL |
| 3,953,856 | 4/1976 | Hammack | 343/10 |
| 3,956,749 | 5/1976 | Magorian | 343/16 R |
| 4,163,974 | 8/1979 | Profera | 343/16 M |
| 4,184,152 | 1/1980 | Albanese et al. | 343/10 |

OTHER PUBLICATIONS

C. E. Cook et al., Radar Signals, Academic Press, 1967, pp. 255-265.
K. Milne, "Principles and Concepts of Multistatic Surveillance Radars", Radar-77, Int. Conf., 10-1977, IEE, London.
D. Archer, Microwave Journal, Oct. 1975, pp. 37-42.
W. P. Delaney, Transactions on Military Electronics, 4-1962, pp. 179-186.
Skolnik, Radar Handbook, 1970, pp. 11-65 to 11-71.

Primary Examiner—S. C. Buczinski
Attorney, Agent, or Firm—Hill, Van Santen, Steadman & Simpson

[57] ABSTRACT

A surveillance radar system comprising an omni-directional transmitter and a number of radar receivers located at different geographic locations from the transmitter which are capable of resolving the angular location of targets by using antenna lobe multiples over the range to be monitored so that anti-range missiles cannot destroy the receivers since their locations will be unknown. The transmitter transmits on a continuous basis rather than on pulsed basis to reduce the probability of location by anti-radar missiles.

6 Claims, 6 Drawing Figures

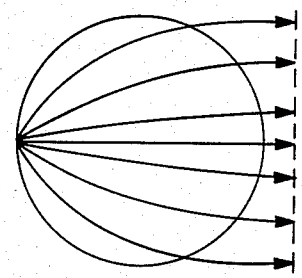
FIG 4
FIG 1
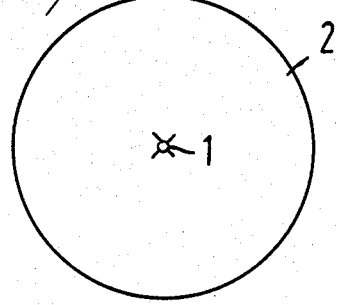
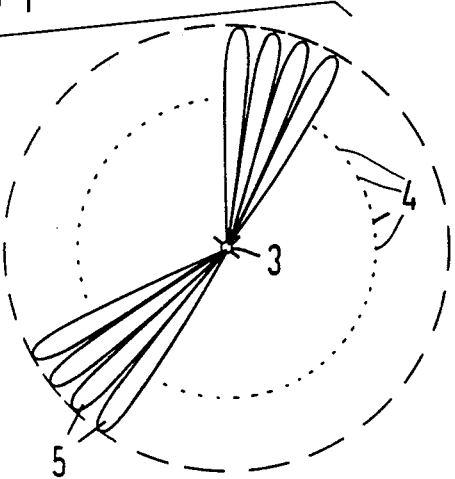
FIG 5
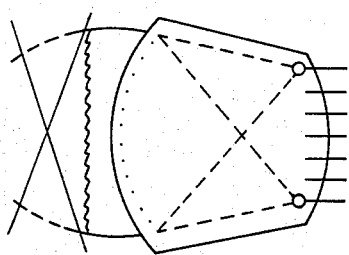
FIG 6
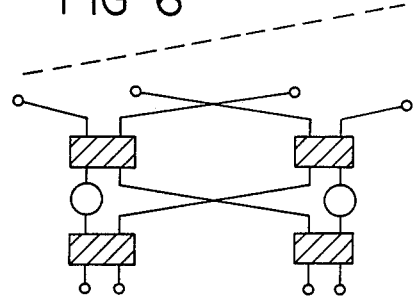

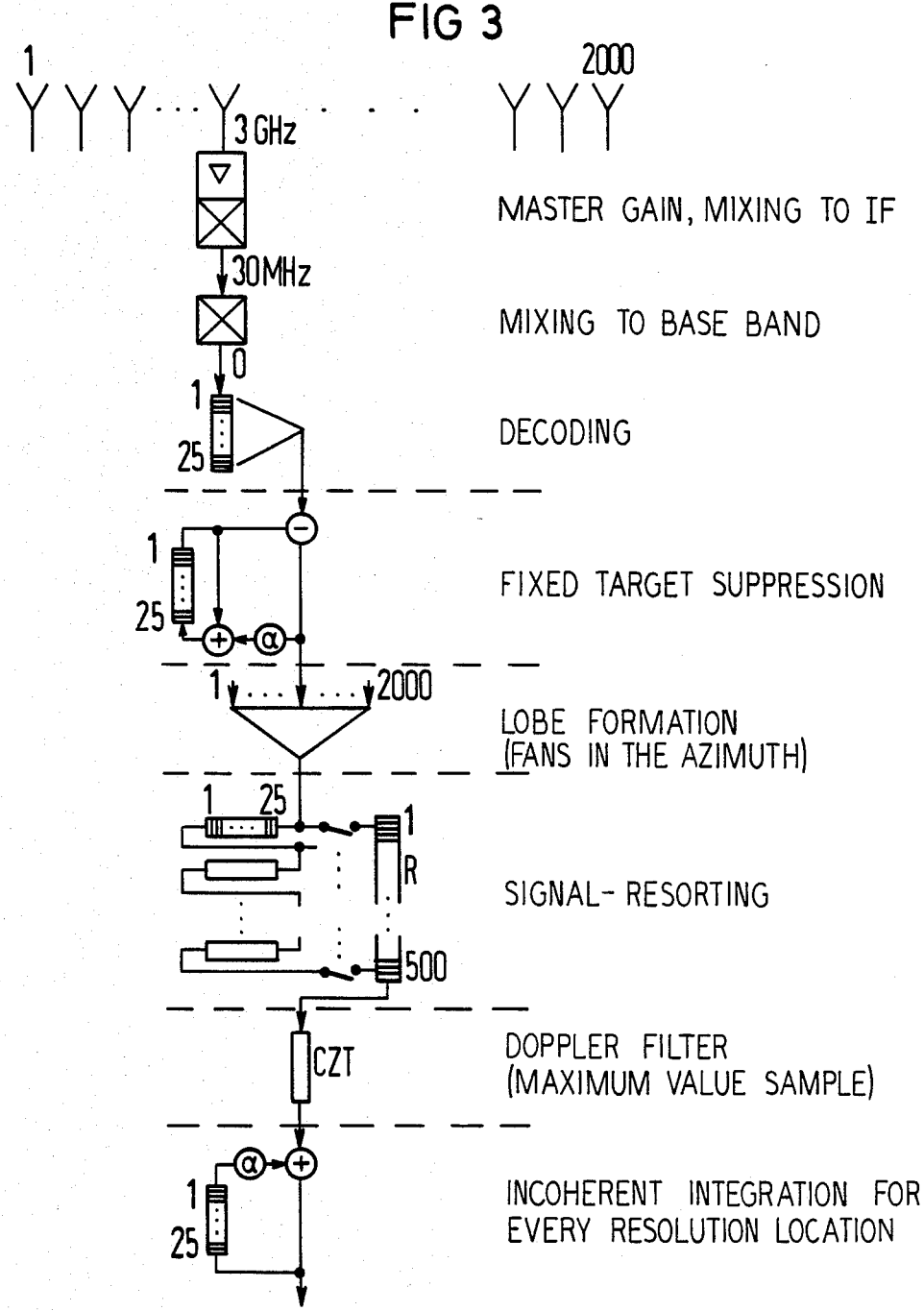

SURVEILLANCE RADAR SYSTEM WHICH IS PROTECTED FROM ANTI-RADAR MISSILES

BACKGROUND OF THE INVENTION

1. Field of the Invention

This invention relates in general to surveillance radar systems which are protected from anti-radar missiles by using a transmitter which radiates a continuous wave signal of constant mean power upon which is impressed coding such that range resolution of the target echo signals can be accomplished by receivers using decoding.

2. Description of the Prior Art

Reconnaissance radars operate with strongly directional beam antennas which are jointly used for transmitting and receiving and operate with short pulses of high peak power.

Anti-radar missiles ARM are in the process of being developed and utilized for the destruction of radar apparatus and such missiles have search heads which utilize the radio frequency radiation of the radar apparatus to locate and guide the missile to the radar apparatus for its destruction.

The periodic regular rotation of the antenna allows the attacking missile to be periodically radiated by the major lobe of the antenna of the radar and the received radar energy is received in a time pulse which is sufficient for steering guidance of the missile. For this reason, the defense of the radar installation by using fraudulent or illusory transmitters is ineffective.

One attempt to prevent the homing in of anti-radiation missiles ARM has been to use a continuous wave signal of equal mean power instead of short pulses of high power with the continuous wave signal being modulated with a code for a range resolution.

SUMMARY OF THE INVENTION

The present invention relates to a radar system in which at least the receivers are safe from anti-radar missiles. The invention prevents the acquisition of a specific radar by the missile and the lock-on of the ARM search head. According to the invention a surveillance radar system utilizes continuous wave signals which are emitted uniformly and omni-directionaly into the area under surveillance and the angular resolution of targets is accomplished at the receiver by means of lobe multiples distributed over the area under surveillance and the receivers are continuously receiving the echos. The invention is particularly effective if a plurality of such radar systems are simultaneously employed in the reconnaissance area and in the resolution range of the ARM search head antenna.

In contrast with previously used radars, according to the invention, high pulse power as well as the formation of a primary lobe at the transmitter is avoided. On the missile platform, the high radiation power density previously received in a regular rhythm of the antenna rotation will be reduced by the factor of $G_S \cdot 1/p$ where $G_S$ is the transmitting antenna gain and p is the pulse-duty factor. The factor $G_S/p$ will fall between $10^5$ to $10^7$ for conventional radars.

Other objects, features and advantages of the invention will be readily apparent from the following description of certain preferred embodiments thereof taken in conjunction with the accompanying drawings although variations and modifications may be effective without departing from the spirit and scope of the novel concepts of the disclosure and in which:

BRIEF DESCRIPTION OF THE DRAWINGS

FIG. 1 is a plan view of the transmitter and a receiver of the invention;

FIG. 3 is a block diagram of the receiver of the invention,

FIG. 4 illustrates a Luneburg-lens;

FIG. 5 illustrates a Rotman-lens; and

FIG. 6 illustrates a Butler-matrix.

DESCRIPTION OF THE PREFERRED EMBODIMENTS

Figure 2:
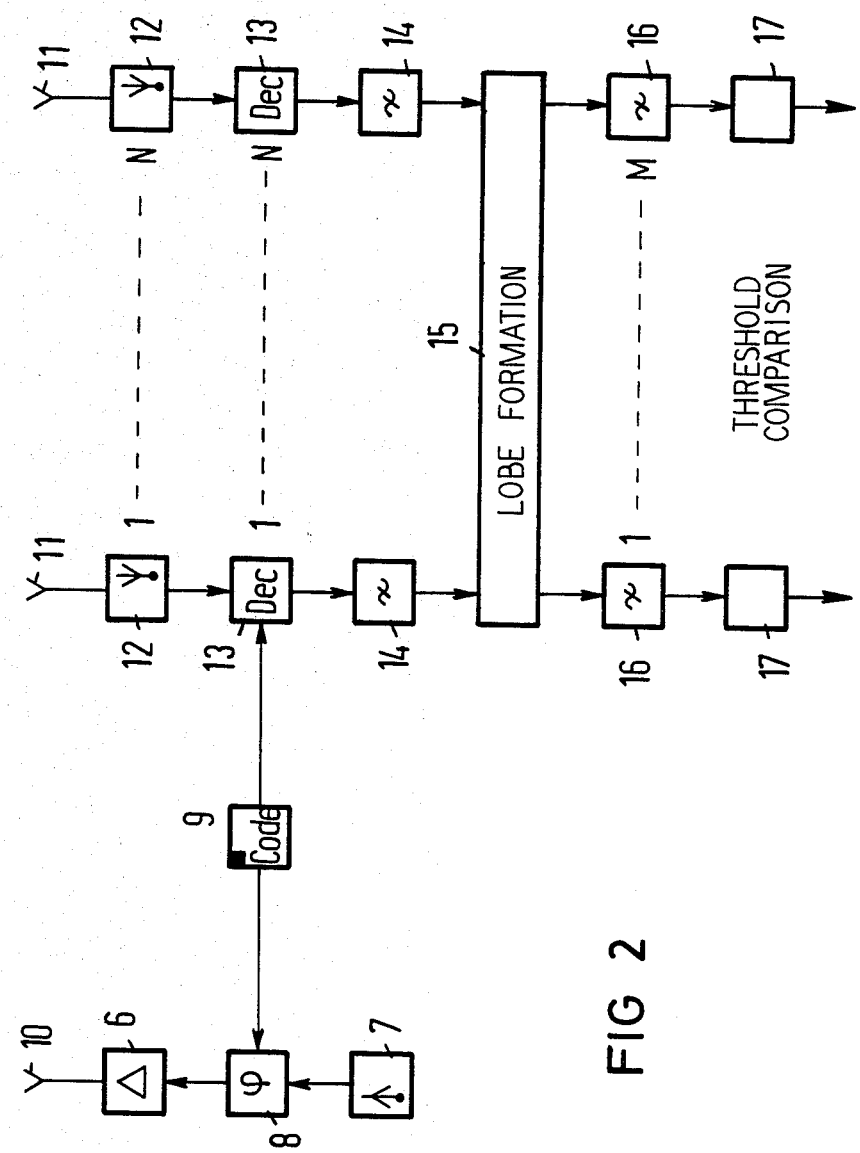
FIG. 2 is a block diagram of the radar transmitter and receivers of the invention.

FIG. 1 illustrates a radar transmitter 1 according to the invention which transmitsan omni-directional radiation pattern into the reconnaissance area to be monitored and one or more radar receivers 3 are geographically located at places which differ from the transmitting site and have directional antennas so as to provide receiving lobe beam multiples 4 which are continuously available for accepting and processing target echo signals passing from the transmitter 1 to a target and to the receiver. The width of the individual receiving lobes 5 determine the angular resolution of the radar and the range resolution is obtained by means of a suitable coding of the transmitting signal and with corresponding decoding or compression at the receiver.

The system of the invention comprises a very simplified transmitter having no unidirectional antennas with controls and no high peak power amplifiers and utilizes a receiving system which is more complex. Since the transmitter 1 is operated and located at a distance from the receiving system, it will not be possible for ARM to track and locate the radar receivers. The present invention provides advantages in signal processing and also since the transmitter 1 is simple and less expensive than transmitters of the prior art in the event the transmitter is destroyed by an ARM it can be cheaply and rapidly replaced. However, a plurality of transmitters can be kept in readiness for use. The valuable passive receiving system will not be endangered by ARM.

So as to maintain the detection properties of the system according to the invention as compared with pulse radars which transmit a primary lobe, the receiver utilizes integration of a longer time interval with correspondingly more individual signals being required. This requires a certain dwell time of the targets within a resolution area which therefore must have a minimum size.

At the receiver, simultaneously a complex signal processing such as pulse compression and integration is expediently accomplished for a large number of receiving lobes 5. The information rate can be accomplished with novel integrated circuits (CCD, LSI) in a particularly advantageous manner.

FIG. 2 illustrates the transmitter and receivers of the invention. The transmitting antenna 10 which may be an omni-directional antenna such as a stationary dipole, or a horizontal ring receives a signal from an amplifier 6 which receives an input from a phase shifter 8. The phase shifter 8 receives the signal from the signal preparing installation 7. The phase shifter 8 also receives an input from a code memory 9 which controls the phase shifter. Thus, the transmitter radiates an omni-directional signal which varies in phase in a known coded manner as determined by the code memory 9. At the receivers, N similarly individual receiving antennas 11 which represent a plane or spatial or a three-dimensional group receive the signal. Each of the receiving antennas is associated with a receiving train 12 which provides amplification and a frequency conversion to a suitable IF frequency. Each of the receiving chains supplies a decoder 13 which receives the output of the receiving train 12 for decoding and detecting the output of the receiving train 12. The decoders 13 compress the received signal so as to accomplish range separation of the echos. Each of the receiving units includes a filter 14 which filters against stationary targets or non-moving echos. These two techniques allow the signal dynamics to be considerably reduced since the signal received directly from the transmitter and the echos from nearby stationary targets will be substantially cancelled or suppressed since the distance from the transmitter to receiver is not moving.

The outputs of all the filters 14 are supplied to a lobe formation circuit 15 which allows the necessary direction selection to be accomplished with a resolution of N. The M receiving lobes are selected since their fixed directions will cover the observation space in an overlapping fashion. For every direction or receiving lobe there will be a filter and integration installation 16 which is connected to the output of the lobe formation circuit 15 and double filtering for purposes of coherent integration and further cancellation and suppression of stationary targets or permanent echos is accomplished and subsequently a subsequent incoherent integration. Both of these integrations must be separately accomplished for all of the range cells, respectively.

Each of the filter integration circuit 16 provide outputs to the threshold comparison circuits 17 which detect and determine the position of targets.

In a specific example, the following parameters were utilized:
Range or radius R = 15 km
Lobe width of the receiving lobes $\theta = 2°$
Radial resolution $\Delta = 600$ m.
Period for code repetition—100 μsec.
Subpulse length$\tau = 4$ μsec.

This results in a code with 25 elements.

With the selected resolution, the target at the greatest distance up to twice the signal velocity remains in a resolution cell at least one second. Therefore, integration is conducted over a one second period. The coherent integration is conducted over 500 code periods and thus it lasts for 500·100 usec or 50 msec. In addition, an integration over 20 output pulses of the Doppler-bank coherent integration is accomplished.

In utilizing the radar equation for the transmission power (with the wave length$\lambda = 10$ cm, the receiving antenna having a gain of $G_E$ of 2000, a receiver-noise factor F = 6 dB, with a return beam or backfire cross-section of $\epsilon = 2$ m$^2$) $P_S \approx 15$W. This power can be realized with semiconductor amplifiers at the present time.

For observation, a spherical characteristic curve for the transmitting and receiving antennas 10 and 11 has been assumed. For the receiving group it is further assumed that lobes in all directions can be formed by the antennas.

An additional reduction of the transmitted power can result if the receiver gain is increased and by restriction of the area to be observed, for example, corresponding to a plane group antenna. If dipoles are utilized as radiators and are mounted before a conductive surface the transmission power $P_S$ can be reduced by the factor of $\pi^2$.

Also a transmitter radiating in all directions can be utilized with four plane receiving antenna groups and then the necessary transmitted power $P_S$ can be reduced by a factor of $\pi$.

FIG. 3 illustrates in greater detail the manner of signal processing.

The selection of a code must consider the fact that the code will be capable of periodic repetition, that a Doppler shift of the echos will have no significant reduction in the decoded signal and that the code will result in side lobes which are as low as possible in Doppler frequency shift equal to zero for fixed target echos.

Polyphase codes are particularly suitable. These are described, for example, in the book of Cook, Bernfeld: "Radar Signals", Academic Press, New York 1967, page 255. These codes are particularly well suited for periodic repetition since without Doppler shift all side lobes disappear. Since on one hand due to the Doppler shift of the signal similar to the case of linear frequency modulation only a minimal apparent range displacement or shift of the target occurs and no substantial attenuation of the signal results and a Doppler bank is not required for decoding. The suppression of clutter side lobes can also be accomplished.

So as to establish a code a natural number n is selected. The length of the code is then $N = n^2$. The code numbers indicate multiples of a phase angle of $2\pi/n$. In the case of n = 8, a code length or period of 64 results and a three-bit phase shifter for phase modulation is required. The method of obtaining the code number is described in the Cook, Bernfeld publication referenced above. In the above example, n = 5 would give a code length of 25. A periodically repeated linear frequency modulation would also be suitable for this code length. Signal compression or decoding can be accomplished in a digital fashion using shift memories and analysis interpretation or can also be accomplished in analog manner for example using CCD shift memories and analysis and evaluation stages.

A higher range resolution requires a shorter subpulse. Since the coherent integration was accomplished only over a period of 50 msec., the range resolution could be improved up to 30 m. For in the case of a target velocity of 600 m/sec. the dwell time in the resolution cell would then be precisely 50 msec. If the subsequent incoherent integration is eliminated, a reduction in the range or radius results by approximately 30%. However, this could be tolerated for more precise target tracking for the purpose of target-combat.

The cancellation or suppression of the fixed target or permanent target clutter can be accomplished in a first step by using a simple recursive filter. Such filter for each individual channel could follow the pulse compression and thus ensures a further dynamic reduction. Since there is no swinging or rotating of a transmitting lobe, fluctuations of the echos are effected only by the clutter behaviour. After switch-on of the system, the filter can be operated with a fixed recursion factor. The obtainable clutter cancellation or suppression is assumed to be at a level of 30 dB.

The fixed target filter can alternatively comprise a digital circuit or can be an analog circuit utilizing CCD shift memories.

Thus, a significant concept of the invention is that the volume being observed which is illuminated by the transmitter is constantly covered by a number of receiving lobe antennas. For example, with a plane radiator group, a sector of 120° in azimuth and 90° in elevation could be observed. Using a lobe width of θ=2° approximately 2000 lobes would have to be formed.

Apparatus which can be used for realizing such system are the Luneberg-lens antenna, the Rotman-lens antenna, the Butler-matrix antenna or a rapid periodic lobe pivoting systems combined with chronological scanning.

The use of active receiving channels such as illustrated in FIGS. 2 and 3 produces particularly favorable results since the lobe formation can be initiated after the described steps for signal processing. This is particularly advantageous in the case of thin plane or spatially distributed antenna groups since the number of lobes will be greater than the number of element channels.

In the case of use of active receiving channels a system such as illustrated in FIG. 3 can be used. After conversion of the signals into the video range, decoding and fixed target filtering, fixed 50 lobes are formed by an evaluation or an analyzing network for covering a particular azimuth area for an elevation which is assumed to be fixed for the time being. By means of a cyclical switch-over of the complex interpretation or evaluation for lobe formation, the azimuth lobe fan can be serially pivoted over 40 elevation steps. The switchover clock pulse could be 10 MHz for the assumed parameters, for example.

The compressed signals for every lobe direction and from every range element are further processed using a Doppler filter bank for the purpose of integration. From each resolution element, the signals will arrive with a clock pulse equal to the code period of 10 kHz. An economical construction of the Doppler filter installation can be accomplished with CCD switching in an analog type system.

Then a resorting of the signals must be accomplished so that continuous or coherent signal sequence results for one resolution cell. This can be accomplished with the arrangement illustrated in FIG. 3. If K signals are to be integrated, K−1 delay lines are necessary with N (N=code length=number of range elements) individual delay lines being used. At a particular time then all K signals from one resolution cell are transferred into the register R for parallel series conversion. The series is supplied to a CZT unit (Chirp-Z-transform) which serially emits the integrated values for all of the Doppler frequencies.

For CZT circuits of this type, a processing clock pulse of, for example, 10 MHz can be utilized. Then the transformation of 500 signals will require only 50 μsec. For all range elements (25), 1250 μsec. are then required. New signal sets however are available only after 500·100 μsec.=50 msec. Consequently, the transformation unit in the multiplex operation can be utilized for all of the elevation steps so that a total of 50 CZT units for all lobes of the azimuth fan will be provided.

It is seen that this invention provides a new and novel radar system which prevents destruction by anti-radar missiles and although it has been described with respect to preferred embodiments, the invention is to be defined by the scope of the appended claims.

I claim as my invention:

1. A radar system comprising a radar transmitter located at a first geographic position and radiating coded omnidirectional signal on a substantially continuous basis, at least one radar receiver located at a second geographic location and including a directive antenna which is capable of being scanned and comprises a multiple lobe beam directional antenna with each lobe of the antenna being selectively connected to the receiver for continuously receiving radiant energy in each of said lobes, means for supplying the code of said transmitter to said receiver, each of said lobes of said directional antenna of said receiver comprising a resolution cell having a size determined by the single lobe width and said cell being at least large enough so that targets have a dwell time in said cell, said radar receiver antenna having a number of receiving elements with said elements determining said multiple lobe beams, a plurality of radio frequency amplifier and frequency conversion stages with one connected to each of said individual antenna elements to continuously receive a particular beam lobe and converting the incoming signal to a base band, a plurality of decoders with one of the decoders connected in each of said receiving lobe beam paths to compress the received signals for distance discrimination, a code member connected to said decoders to control them with the same code as utilized in said transmitter, a plurality of first filters with a single filter connected to each of said plurality of decoders for filtering out permanent target echoes, a lobe formation network receiving the outputs of all of said plurality of first filters and supplying a plurality of outputs corresponding to the number of said receiving paths in said receiver, a plurality of second filtering means receiving the outputs of said lobe formation network and said second filtering means each comprising Doppler filters for coherent integration and further suppression of permanent signals in each lobe path through the receiver, and a plurality of integrators with at least one integrator connected in each receiving path for performing incoherent integration in each receiving path receiving the outputs of said second integrators so as to produce the output signals for each of said receiving paths of the receiver characterized in that the transmitter (1) is arranged at a specified distance from at least one receiver (3), and characterized in that the transmitter (1) has an antenna (10) with a constant omni-directional characteristic which may be a vertical dipole or a horizontal omni-directional antenna.

2. A surveillance radar system according to claim 1, characterized in that, after the integration filters (16), a threshold comparator circuit (17) is provided in every directional channel.

3. A surveillance radar system according to claim 1 characterized in that, for the coding of the continuous wave-transmit signal, a periodically repeating polyphase code is employed.

4. A surveillance radar system according to claim 1, characterized in that, for the coding of the continuous wave-transmit signal, a periodically repeating linear frequency modulation is employed.

5. A surveillance radar system according to claim 1, characterized in that the antenna of the receiver is designed in the form of a Luneburg-lens or Rotman-lens.

6. A surveillance radar system according to claim 1, characterized in that the antenna of the receiver comprises a Butler-matrix for lobe formation.

* * * * *